Aug. 2, 1966      A. R. KANTROWITZ ETAL      3,264,501
MAGNETOHYDRODYNAMIC POWER PLANT
Filed Feb. 15, 1960                          5 Sheets-Sheet 1

ARTHUR R. KANTROWITZ
THOMAS R. BROGAN
        INVENTORS

BY *Alden D. Redfield*
   *Warren Kent*
            ATTORNEYS

Aug. 2, 1966    A. R. KANTROWITZ ETAL    3,264,501
MAGNETOHYDRODYNAMIC POWER PLANT
Filed Feb. 15, 1960    5 Sheets-Sheet 2
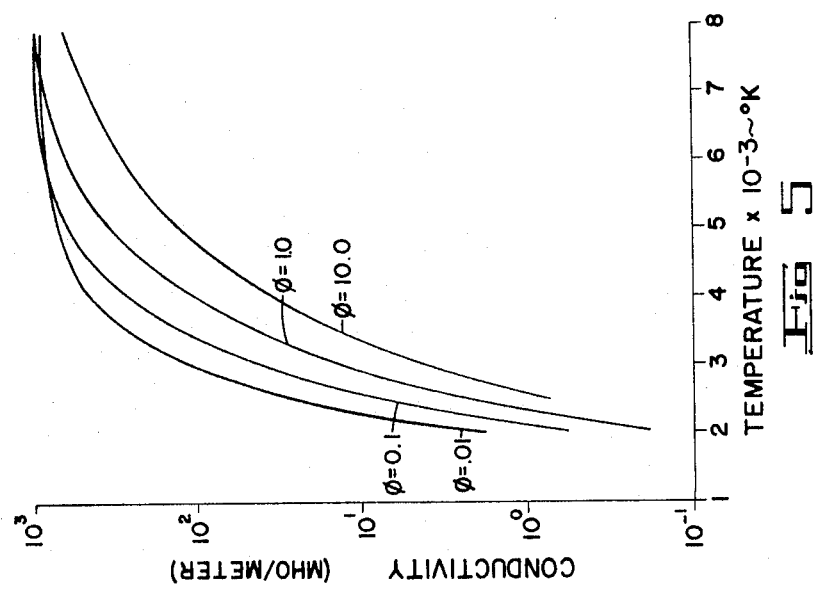
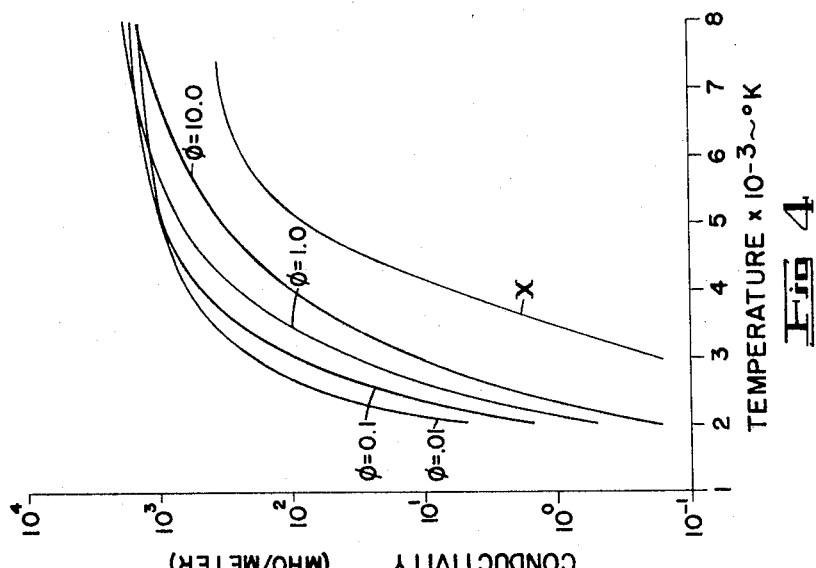
ARTHUR R. KANTROWITZ
THOMAS R. BROGAN
INVENTORS
BY Alden D. Redfield
Warren Kunz
ATTORNEYS

ARTHUR R. KANTROWITZ
THOMAS R. BROGAN
INVENTORS

BY *Alden D. Redfield*
*Warren Kunz*
ATTORNEYS

ARTHUR R. KANTROWITZ
THOMAS R. BROGAN
INVENTORS

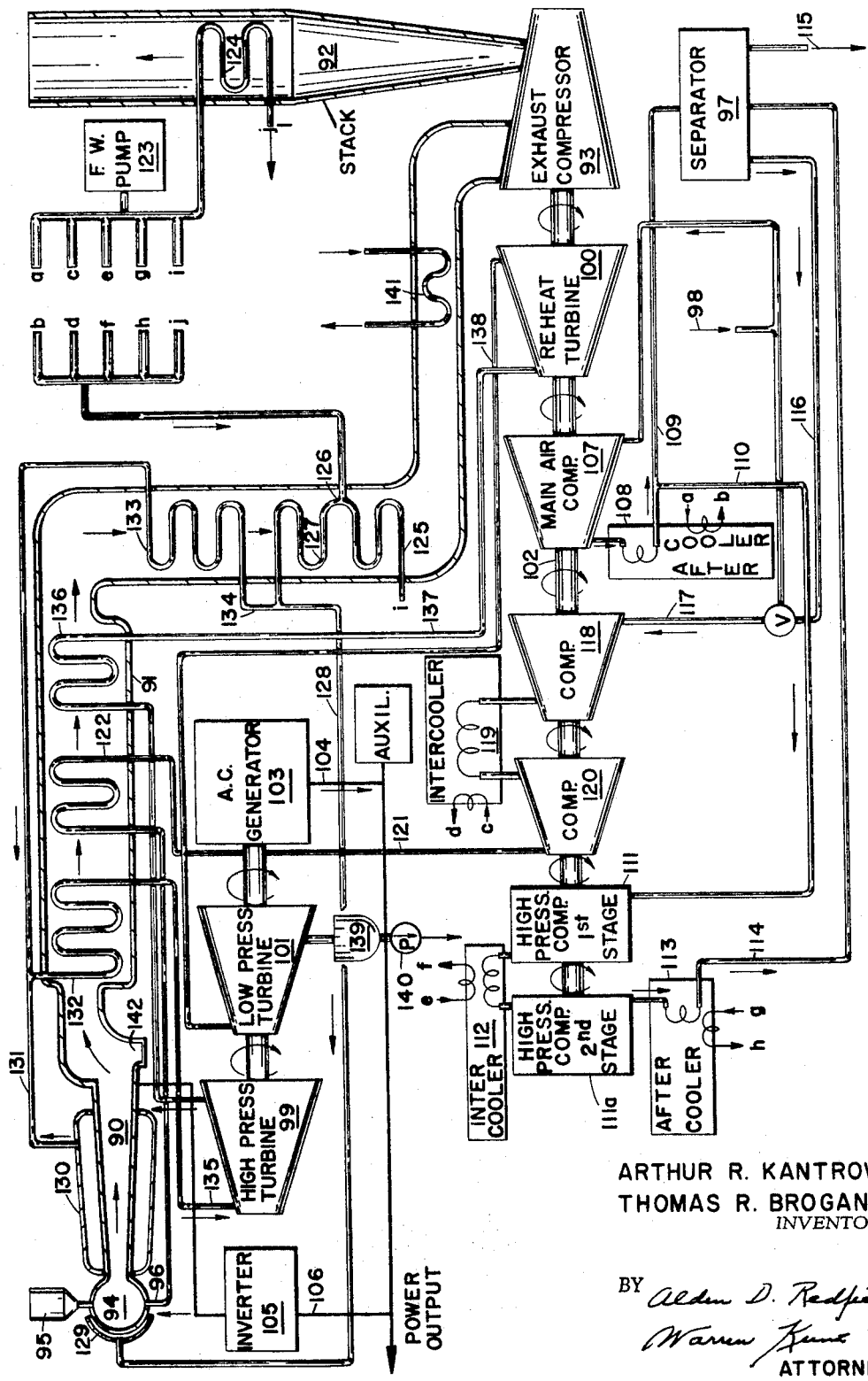

United States Patent Office 3,264,501
Patented August 2, 1966

3,264,501
MAGNETOHYDRODYNAMIC POWER PLANT
Arthur R. Kantrowitz, Arlington, and Thomas R. Brogan, Winchester, Mass., assignors to Avco Corporation, Cincinnati, Ohio, a corporation of Delaware
Filed Feb. 15, 1960, Ser. No. 8,566
25 Claims. (Cl. 310—11)

The present invention relates to a power plant for generating electricity and, more particularly, to a power plant employing a magnetohydrodynamic (hereinafter abbreviated "MHD") generator. More specifically, the invention relates to such a power plant having means for heating working fluid for the generator to a high temperature by combustion of fuel in an oxygen-rich atmosphere.

In general terms, MHD generators produce electrical power by movement of electrically conductive fluid relative to a magnetic field. The fluid employed is usually an electrically conductive gas from a high temperature, high pressure source. From the source, the fluid flows through the generator and, by virtue of its movement relative to the magnetic field, induces an electromotive force between opposed electrodes within the generator. The gas may exhaust to a sink, which may simply be the atmosphere; or, in more sophisticated systems, the gas may exhaust to a recovery system including pumping means for returning the gas to the source.

Several different gases may be used; the gas may simply be air, or may comprise inert gases, such as helium or argon. In open systems, i.e., those in which the gases are not recovered after passing through the power plant, air is normally used. In closed systems, in which the gases are recovered and recirculated, it is feasible to use relatively expensive gases, such as helium and argon. To promote electrical conductivity, the gases are heated to high temperature; conductivity may also be increased by the addition to the gases of a substance that ionizes readily at its operating temperature. Regardless of the gas used, it comprises a mixture of electrons, positive ions and neutral atoms which, for convenience, may be termed "plasma."

Briefly described, the present invention comprises a novel power plant having means for supplying high temperature plasma to the MHD generator portion of the power plant. Such means may include: a combustion chamber in which a relatively cheap fuel, such as pulverized coal, is burned in the presence of pure oxygen, or oxygen-entriched air, and means for separating oxygen from ambient air and supplying the oxygen, either in pure form or diluted with a certain proportion of nitrogen, to the combustion chamber. By burning the fuel in an oxygen-rich atmosphere, high combustion temperatures may be developed without extensive preheat of the gases prior to combustion. The high temperature combustion products may be seeded with an additive to promote ionization and may be supplied directly to the MHD generator; or if desired, the combustion products may pass through a heat exchanger for heating plasma for use in a closed MHD generating cycle. Power for operating the oxygen separator is derived from the power plant itself.

The temperature of the plasma is highly significant, not only to the overall efficiency of the system, but also to the design of the MHD generator. With a higher temperature available at the inlet of the generator, a larger isentropic drop can be developed as the plasma expands through the generator, resulting in improved efficiency. Further, since the electrical conductivity of the plasma increase greatly as temperature increases, it is possible to generate a given amount of power in a relatively smaller generator, employing a smaller magnetic field, than would otherwise be possible. The increased efficiency of the system, considerably above that of conventional steam turbine power plants, and the absence of hot moving parts in the generator suggest that, in time, the present invention will replace power generating systems of conventional design.

From the foregoing brief description, it will be apparent that the novel power plant of this invention comprises several interdependent components for producing a combustion supporting medium, burning fuel in the medium to produce high temperature plasma, using the plasma to generate power, and using a portion of the power from the power plant to produce the combustion supporting medium. Thus, the power plant comprises a self-contained entity capable of generating power beyond its own requirements.

In view of the foregoing, it will be apparent that it is an object of the present invention to provide an improved electric power generating system characterized by very high operating efficiency.

Another object of the invention is to provide a power generating system having a combustion chamber for burning fuel in the presence of a relatively low temperature combustion supporting medium to produce combustion products of extremely high temperature and, more particularly, to provide such a system in which significant preheat of the combustion supporting medium is unnecessary.

A further object of the invention is to provide an MHD power plant including means for producing oxygen for use in supporting combustion of fuel to provide a high temperature working fluid for the MHD generator portion of the power plant.

A further object of the invention is the provision of an electric power generating system having high peak surge capability for meeting power requirements during periods of high demand.

Other objects of the invention are:

(a) The provision of a power generating system capable of producing its own combustion supporting medium in proportion to its demands.

(b) The provision of a system in which a separator, for separating oxygen from the air, is provided as an integral portion of the system.

(c) The provision of a system capable of developing and utilizing high peak cycle temperatures efficiently and reliably.

(d) The provision of both open cycle and closed cycle MHD power generating systems in which fuel is burned in an oxygen-rich atmosphere to produce high temperature plasma for use in the MHD generator portion of the system.

(e) The provision of an MHD power generating system, employing high temperature plasma, which includes conventional steam power equipment for deriving maximum benefit from the energy of the plasma.

(f) The provision of a power generating system of modest cost but high operating efficiency.

(g) The provision of a power generating system in which efficient use is made of the capital invested in the system.

(h) The provision of a system that yields large quantities of nitrogen as a valuable by-product.

The novel features that we consider characteristic of our invention are set forth in the appended claims; the invention itself, however, both as to its organization and method of operation, together with additional objects and advantages thereof, will best be understood from the following description of specific embodiments when read in conjunction with the accompanying drawings, in which:

FIGURES 4 and 5 are graphs illustrating the relation of electrical conductivity of gases to temperature at various densities;

FIGURE 10 is a schematic showing the details of a particular open type oxygen cycle power generating system.

MHD generator principles

Figure 1:
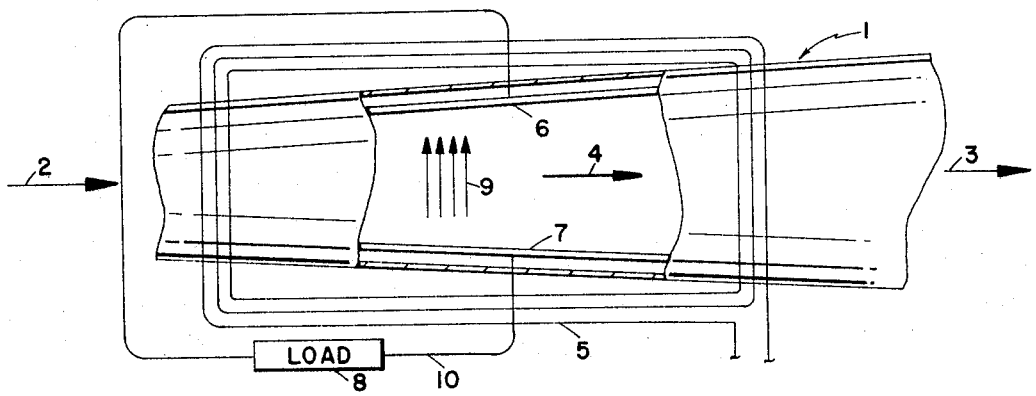
FIGURE 1 is a schematic illustration of a conventional MHD generator.

A knowledge of MHD generator principles will promote an understanding of the present invention. For this reason, there is shown in FIGURE 1 a schematic of a conventional MHD generator. As illustrated in that figure, the generator comprises a tapered duct, generally designated 1, to which high temperature, high pressure, electrically conductive plasma is introduced, as indicated by the arrow at 2, and from which it exhausts, as indicated by the arrow at 3. The pressure at the exit of the duct is lower than at its inlet; and for this reason, the plasma moves at high velocity through the duct, as indicated by the arrow at 4. By properly choosing the pressure differential and the shape of the duct, the plasma can be made to move through the duct at substantially constant velocity, which is desirable, although not necessary to the operation of the generator. Surrounding the exterior of the duct is a continuous electrical conductor in the form of a coil 5 to which electrical current may be supplied from any conventional source or from the generator itself. Flow of electrical current through the coil establishes a magnetic flux through the duct, perpendicular to the direction of plasma flow and the plane of the paper.

Within the duct are provided opposed electrodes 6 and 7. These electrodes may extend along the interior of the duct parallel to the direction of plasma movement and may be positioned opposite one another on an axis perpendicular to both the direction of plasma movement and the magnetic flux.

High velocity movement of the electrically conductive plasma through the magnetic field induces a unidirectional E.M.F. between the electrodes, such as indicated by the arrows at 9. The electrodes 6 and 7 are connected by conductor 10 to a load 8 through which electrical current flows under the influence of the E.M.F. induced between the electrodes.

Figure 2:
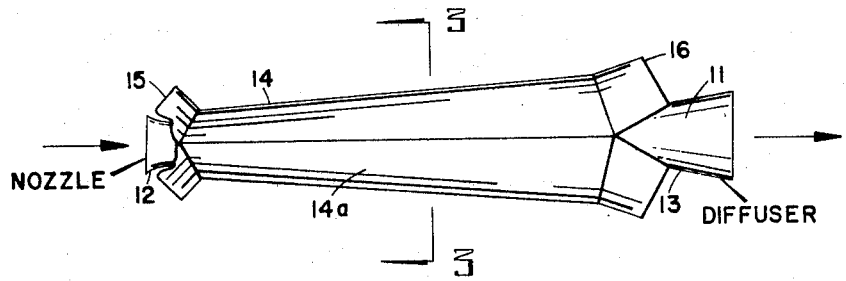
FIGURE 2 is a schematic illustration of an MHD generator that may be employed in the novel system herein described.
Figure 3:
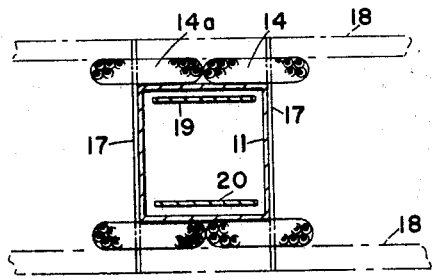
FIGURE 3 is a cross sectional view of an MHD generator taken on plane 3—3 of FIGURE 2.

Directing attention now to FIGURE 2, there is shown a top view of a tapered MHD generator duct 11 including an inlet nozzle 12 and a diffuser portion 13. The duct, as shown in FIGURE 2, is more realistically proportioned than in the schematic of FIGURE 1. Associated with one longitudinal half of the duct is the electrical field coil 14 which extends parallel to the duct along its top and bottom surfaces (see FIGURE 3) and transversely of the duct at its ends adjacent the nozzle and diffuser, as indicated at 15 and 16. As shown in FIGURES 2 and 3, a similar coil 14a is associated with the other half of the duct. The duct may be of generally rectangular cross section and may be supported by tension members 17 from a foundation structure 18.

In FIGURE 3, the electrodes 19 and 20 are shown in cross section inside the duct. These electrodes may be made from a wide variety of materials, both metals and nonmetals. For instance, if the electrodes are cooled, they may be made from copper or stainless steel. Tungsten also lends itself to use as an electrode material. The electrodes may also be made from carbon.

It will be noted that the generator does not have any moving parts. This is particularly desirable as will be recognized when it is understood that the plasma at the inlet of the generator may have a temperature of several thousand degrees Fahrenheit. Although the plasma, which at the inlet of the duct may have a pressure of 10 atmospheres or more, is highly heated, the static nature of the structure makes possible use of conventional materials well within the state of the art.

From the standpoint of thermodynamics, the MHD generator is a heat engine through which a high temperature, high pressure working fluid expands as power is extracted therefrom. Ideally, the expansion should be isentropic and this may be closely approached in practice. As will be understood by those skilled in the art, the isentropic drop that can be realized as the fluid passes through the generator is a function of both its inlet temperature and pressure. Because the generator involves no moving parts, an inlet temperature greatly in excess of that used in conventional turbines may be employed with an attendant increase in the isentropic drop that can be realized. To illustrate, in present day steam plants, the maximum steam temperature is limited to approximately 1100° F. Such is the case because the high stress, imposed on moving portions of the system, limits operating temperatures and further because the economics of commercial plant construction prohibit the use of materials capable of operation at temperatures in excess of 1100° F.

Even if cost were no object, the best materials now available for turbine blades limit turbine inlet temperatures to a maximum of approximately 1800° F. Thus, the steam generating cycles dictate that the fuel-air combustion temperature of about 3100° F. be degraded to a maximum operating temperature at the turbine in the order of 1100° F. to be compatible with economic plant construction. The degradation of peak cycle temperature necessarily limits the overall cycle efficiency that can be realized. Even in systems employing gas turbine cycles, cost and material limitations are present, resulting in significantly lower operating efficiencies than can be attained by use of the present invention.

In contrast, an MHD generator may be operated with an inlet temperature in the order of 5000° F. or higher. The isentropic drop that can be realized in the turbine is accordingly greatly increased and in this way a significant improvement can be realized over the most efficient conventional power plants now projected.

Successful MHD generator operation depends upon two important temperatures. The first is the lowest temperature at which adequate gas conductivity can be achieved; the second temperature is that of available thermal supplies for heating the working fluid economically.

The electrical conductivity of a gas is fundamentally related to its thermal ionization. Since the degree of thermal ionization is a steep function of gas temperature, there is a limiting temperature below which requisite ionization cannot be achieved. Even if an easily ionizable substance is added to the gas, this low temperature limit is approximately 4000° F. for combustion products or similar gases. For inert gases used in closed cycles, the lower operating limit is approximately 2800° F. This will be understood when it is realized that thermal ionization is very much like molecular dissociation and has the same kind of dependence upon temperature. In the same way that the temperature at which a molecule dissociates depends upon the value of its "dissociation energy," the temperature at which an atom or molecule ionizes depends upon its "ionization energy." Most common gases, such as air, carbon monoxide, carbon dioxide or the noble gases, have a relatively high ionization energy and, hence, do not ionize until quite high temperatures are reached. However, if a small amount (0.1 to 1%) of some easily ionizable material, such as an alkali metal vapor, is added to the gas, a sufficient degree of ionization can be attained at a much lower temperature.

Shown in FIGURE 4 is a graph illustrating conductivity $\sigma$ in mhos/meter v. temperature in degrees Kelvin for gases including 1% potassium. Designated by $\phi$ is the gas density in atmospheres for each curve. The graph of FIGURE 4 is drawn for gases having an electron molecular cross section of $10^{-15}$ cm.$^2$. In FIGURE 5 are illustrated a similar family of curves for gases with 1% potassium in which the electron molecular cross section is $3 \times 10^{-15}$ cm.$^2$.

These curves illustrate that gas conductivity is steeply dependent upon gas temperature. Although the electron molecular cross section depends upon the particular gas used, a typical average value for combustion gases useful in MHD generators is approximately $1.5 \times 10^{-15}$ cm.$^2$, falling in the range defined by the curves of FIGURES 4 and 5. Thus, as illustrated by these curves, within the range of practical working fluids, even those including an additive, temperatures in excess of about 2600° K. are necessary if high gas conductivity is to be attained.

Included in FIGURE 4 is a curve, designated X, showing the electrical conductivity of air without additives. A study of this curve will reveal that the conductivity of air is very low at temperatures below 3000° K. This illustrates the desirability of using not only a high temperature working fluid but also one containing additives.

Figure 6:
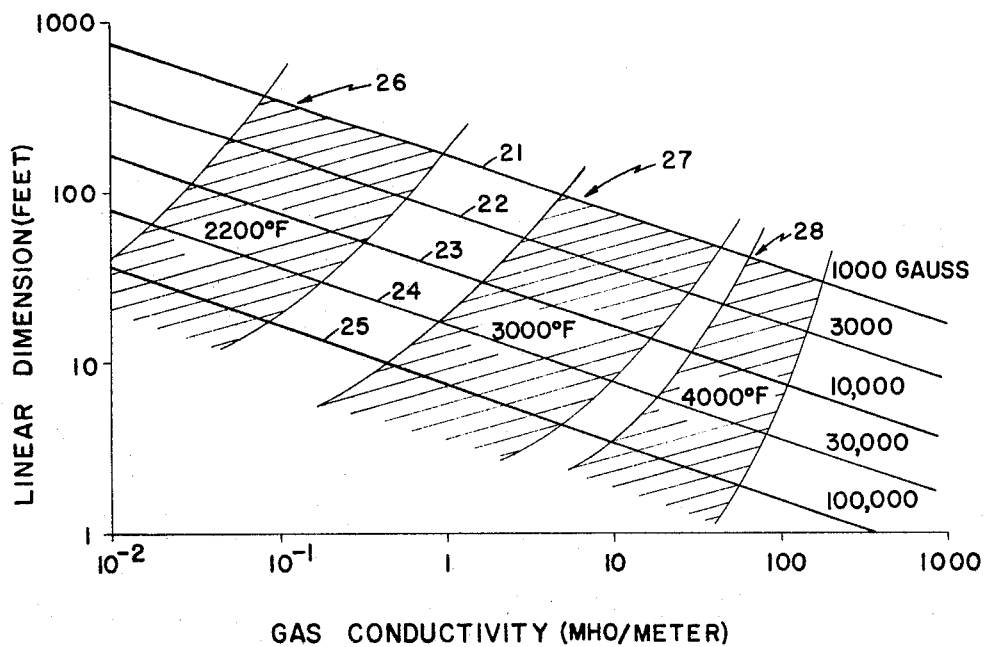
FIGURE 6 is a chart illustrating the relation of electrical conductivity to MHD generator size and magnetic field strength.

Shown in FIGURE 6 is a chart illustrating the relationship of gas conductivity to the length of an MHD generator for a 100 megawatt output. The parallel lines 21–25 are lines of constant magnetic field strength ranging from 1000 to 100,000 gauss. For any given gas conductivity, it will readily be seen that the length of the generator is reduced as the magnetic field strength of the generator is increased.

Also indicated on the chart are regions of approximately constant gas temperatures, generally designated 26, 27 and 28. These regions indicate that, for a given magnetic field strength, gas conductivity is increased and generator size is decreased as gas temperature is increased. Thus, in general terms, it is apparent that the higher the gas temperature and the higher the magnetic field strength, the smaller will be a gas generator for a given power output.

Since heat transfer to the wall of the duct is apt to be one of the largest single sources of loss in MHD generators operated at high temperature, the need for minimizing wall area is apparent. It has been determined that duct length is inversely proportional to the magnetic field strength squared. On the other hand, the joule loss per unit length of field coil increases as the square of the field strength, so the total field loss remains more or less constant. Therefore, in general, use of a high field strength is to be recommended to reduce duct length and wall heat losses.

For a linear generator configuration as illustrated, the duct length-to-diameter ratio should not exceed a value of about 20 and the duct cross section should be approximately square.

The importance of high field strength will also be understood from the following equation for power (W) transferred per unit volume from gas to load:

$$W = \sigma\ u^2 B^2\ \alpha(1-\alpha) \text{ watts/meter}^3 \qquad (1)$$

where:

$\alpha = -E/uB$
$u$ = gas velocity (meters/sec.)
$B$ = magnetic field strength (webers/meter$^2$)
$E$ = electric field parallel to the induced field (volts/meter)
$uB$ = induced field (volts/meter)

From Equation 1 it is evident that power output is directly dependent on gas conductivity and increases with the square of gas velocity and field strength.

As already mentioned, an important criterion in MHD generator operation is the temperature of available thermal supplies for heating gases. The limiting factors in generating gas of requisite temperature are the high temperature limits of available refractories and the temperature which can be produced by chemical combustion. Direct combustion of chemical fuel (coal, oil, natural gas, gasified coal, etc.) and air, not preheated, yields gaseous products at about 3100° F. The electrical conductivity of combustion products at such temperatures is insufficient to permit design of an effective MHD generator even if the combustion products are seeded with an easily ionizable substance, such as cesium, potassium, or sodium. In order to raise the temperature of the products of combustion, the air may be preheated before combustion. Thus, by way of illustration, the air may be preheated to about 3600° F. and fuel may be burned in the air to produce a plasma of about 5300° F. This requires, however, a preheater capable of handling large masses of gas at very high temperature and, as will be explained, is not considered the most desirable solution to the problem. Far more desirable is to burn the fuel, not in air, but in pure oxygen or in an oxygen-rich atmosphere to produce a high temperature plasma with little or no preheat of the combustion supporting medium supplied to the combustion chamber. Systems of both types will now be described.

*Open cycle preheat system*

Figure 7:
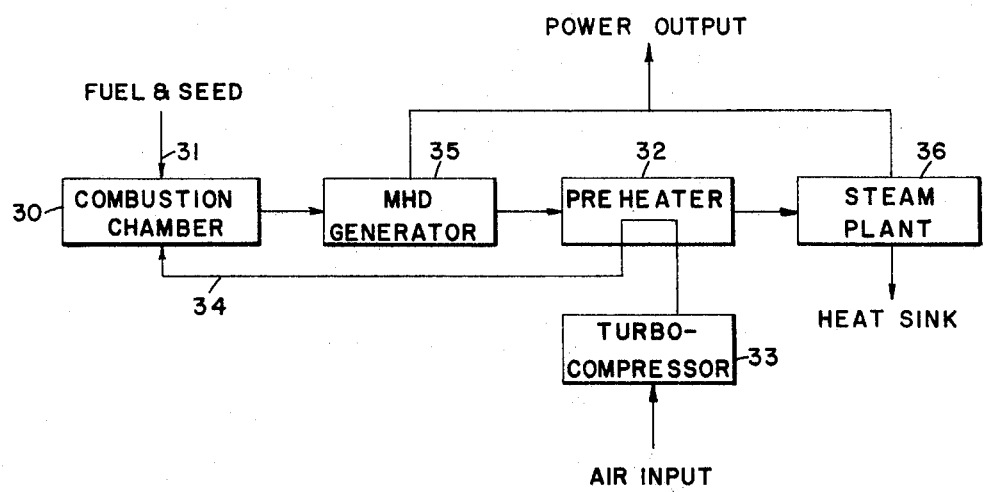
FIGURE 7 is a block diagram illustrating one type of open cycle MHD power generating system.

In FIGURE 7 is illustrated in block diagram form a power generating system in which fuel including an easily ionizable impurity (seed), is introduced to combustion chamber 30 as indicated at 31, and is burned in the presence of air. In order to develop within the combustion chamber a plasma of sufficiently high temperature, the air is first preheated, as in preheater 32. The air is aspirated from the atmosphere by turbo-compressor 33 and passes through the preheater before introduction to the combustion chamber at 34.

The hot, electrically conductive plasma from the combustion chamber is introduced directly to an MHD generator 35. After expansion in the MHD generator to a lower temperature, the plasma constitutes a working fluid of relatively poor electrical conductivity. The working fluid flows through the preheater where a portion of its heat is used for preheating the air introduced to the combustion chamber at 34. From the preheater, the working fluid, still further reduced in temperature, flows to a steam plant 36 and eventually to a heat sink, such as the atmosphere. The steam plant may comprise conventional heat exchangers for extracting heat from the working fluid and generating steam for driving steam turbines. The turbines may drive generators for supplementing the power output of the MHD generator and may drive auxiliaries, such as the turbo-compressor 33.

As has already been mentioned, the plasma supplied to the MHD generator must enter at very high temperature, preferably above 5000° F. Since a temperature rise of only about 3000° F. can be realized through combustion of fuel in air at room temperature, the air must be preheated in excess of about 3000° F. This means that the preheater must operate at temperatures in excess of 3000° F. Such operating temperatures pose serious design problems and require the use of expensive materials, such as zirconia, in the preheater. In a system for central power station use, large quantities of air would be employed and the preheater would assume very large proportions. In addition, slag in combustion products may prove destructive to preheater materials.

For these reasons, the system shown in FIGURE 7, although theoretically feasible, presents serious economic and operational problems that may be avoided by use of the novel systems now to be described.

Open cycle oxygen system

Figure 8:
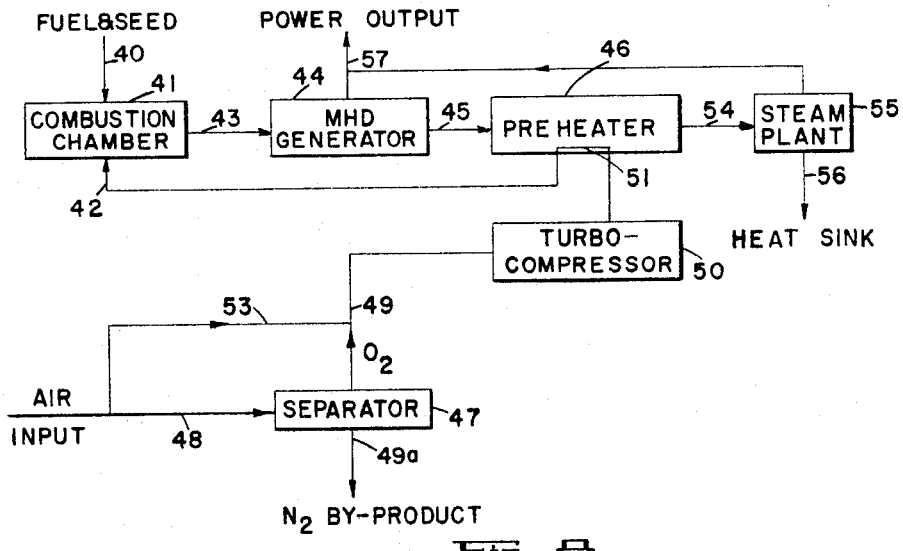
FIGURE 8 is a block diagram illustrating one embodiment of our novel power plant incorporating means for separating oxygen from the air for use in the combustion chamber of its open cycle system.

Shown in FIGURE 8 is a block diagram of a novel system in which fuel, such as powdered coal, is introduced with seed at 40 to combustion chamber 41. Also introduced to the combustion chamber, as at 42, is pure oxygen or an oxygen-rich combustion supporting medium. Since the heat release within the combustion chamber per pound of working fluid can be greatly increased with higher concentrations of oxygen than found in air, and the normal nitrogen content of the air need not be heated to operating temperatures, the plasma leaving the combustion chamber at 43 and entering the MHD generator 44, can easily be produced at a temperature in excess of 6000° F. With a higher plasma temperature at the inlet of the MHD generator, a larger amount of energy can be extracted by the generator in expanding the plasma to a given lower pressure, resulting in increased operating efficiency.

After leaving the MHD generator, the plasma, which is now more appropriately termed "working fluid," is introduced at 45 to a preheater 46. In the preheater, heat is extracted from the working fluid to mildly preheat the oxygen-rich combustion supporting medium before it enters the combustion chamber.

A separator, capable of separating oxygen from air, is shown at 47. Air is introduced to the separator at 48, the oxygen leaving the separator at 49 and the nitrogen leaving the separator at 49a. The oxygen is compressed by a turbo-compressor 50 and is forced through the preheater at 51 before being introduced to the combustion chamber at 42. Air may be introduced at 53 to the oxygen if the combustion chamber is to be operated with oxygen-enriched air instead of pure oxygen. If desired, an oxygen-rich combustion supporting medium may be produced by simply reducing the nitrogen content of the air to produce an oxygen-rich mixture.

Returning to a consideration of the plasma flow, it leaves the preheater at 54 and enters steam plant 55 of the type described earlier. Steam from the steam plant may be used to drive the turbo-compressor 50. The spent working fluid exhausts to the atmosphere at 56. Electrical power generated by the MHD generator and the steam plant leaves the system at 57.

In a system of the type described, the amount of preheat of the oxygen or oxygen-enriched air may be very slight, in the order of 1000° F. or less. For this reason, the construction of a preheater for such a system presents no problems and is well within the skill of the art.

Closed cycle oxygen system

Figure 9:
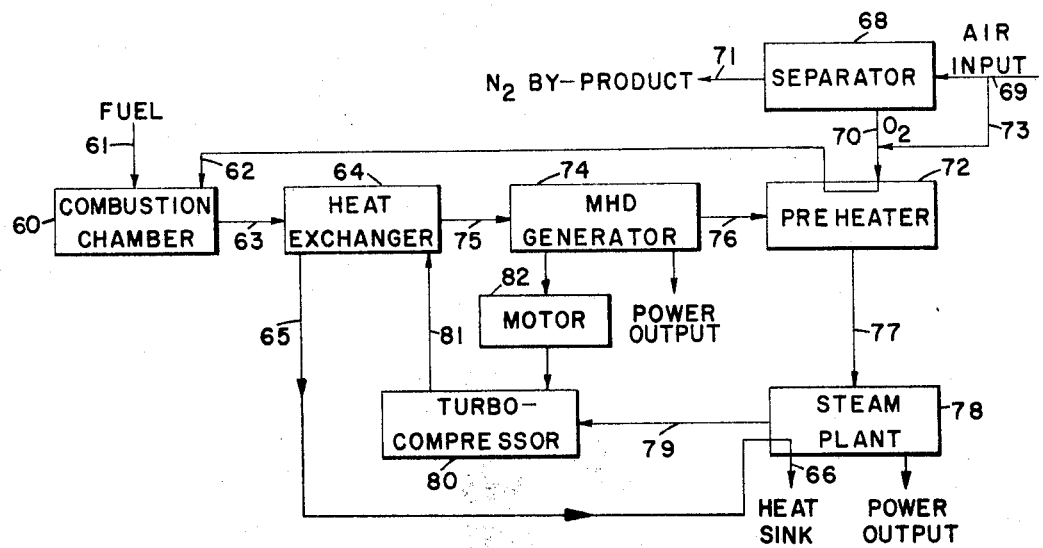
FIGURE 9 is a block diagram illustrating another embodiment of our novel power generating system incorporating a closed MHD generator cycle.

Shown in block diagram form in FIGURE 9 is a modification of the invention in which the plasma for the MHD generator circulates in a closed cycle, and in which the fuel is burned in the combustion chamber in the presence of oxygen or an oxygen-rich combustion supporting medium. Directing attention to that figure, it will be noted that the combustion chamber is shown at 60. In a manner similar to that described with reference to FIGURE 8, fuel is introduced to the combustion chamber at 61 and either oxygen or oxygen-rich medium for supporting combustion of the fuel is introduced at 62. High temperature combustion products from the combustion chamber are introduced at 63 to a heat exchanger 64. After extraction of heat in the heat exchanger, as will be described, the combustion products are introduced at 65 to a conventional steam plant 78 and eventually exhaust to the atmosphere at 66.

The system includes a separator 68 for separating oxygen from the air, introduced to the separator at 69. The oxygen leaves the separator 70 and nitrogen leaves the separator at 71. Before being introduced to the combustion chamber at 62, the oxygen may be heated in preheater 72, later to be described. Air may be introduced to the oxygen through bypass 73, as described with reference to FIGURE 8.

Attention may now be directed to the closed MHD cycle. An MHD generator 74 receives high temperature plasma at 75, and, after extraction of energy therefrom, discharges the plasma at 76 to the preheater 72. In the preheater the plasma, now more aptly termed "working fluid," yields some of its heat to the oxygen-rich mixture flowing to the combustion chamber and is thereafter introduced at 77 to steam plant 78. The steam plant includes heat exchangers for extracting more heat from the working fluid before discharging the working fluid at 79 to a turbo-compressor 80. The turbo-compressor compresses the working fluid and supplies it at 81 to the heat exchanger at 64 where it is reheated to form plasma, completing the closed cycle.

The steam plant may drive turbo-compressor 80. Since, an inert gas system may operate at lower temperatures than a system using combustion products, the power output of the steam plant may be relatively low. A motor 82, deriving power from the MHD generator 74, may be provided to aid in driving the turbo-compressor. Power from either the steam plant or the MHD generator may be used to operate the separator.

It will be noted from the foregoing description that the plasma for the MHD generator circulates in a closed system and is not contaminated by the combustion products from the combustion chamber. Although the system is characterized by the presence of a large, high temperature heat exchanger 64, it makes use of an inert gas plasma possible. Use of such a plasma in an open system would be prohibitive in cost, but in a closed system, in which none of the plasma is lost, expensive gas such as helium and argon, can be used. The system has the additional benefit of preventing contamination of the MHD electrodes by slag from the combustion chamber.

With the benefit of the foregoing information about MHD generators and power generation systems, attention may now be directed to the details of a specific power generating system.

Open-type oxygen cycle power plant

FIGURE 10 shows an open-type oxygen cycle power generating system capable of producing 436,000 kw. net power output. A specific arrangement of components is described together with representative values for purpose of illustration rather than limitation. The power plant includes a combustion chamber, a linear MHD generator, an associated steam plant, and a particular configuration of oxygen separator for supplying a mixture of 87% oxygen and 13% nitrogen to the combustion chamber. It should be clearly understood, however, that the invention is adaptable to any other type of MHD generator, cooperating with any other type of oxygen supply and is effective with various degrees of oxygen enrichment.

Directing attention now to FIGURE 10, certain portions of the system should first be noted. These are the MHD generator 90 and exhaust duct 91 which conveys plasma from the outlet of the generator to exhaust stack 92. Since in the particular system illustrated it is desirable to operate the exhaust duct below atmospheric pressure in order to realize a large pressure drop through the generator, an exhaust compressor 93 is provided to induct the combustion products from the exhaust duct and force them up the stack.

The combustion chamber for supplying plasma to the MHD generator is shown at 94. Although other fuels could be used, a source of pulverized coal is shown at 95 for purposes of illustration. It will be understood by those skilled in the art that a screw type feeder, or any other stoker mechanism, may be used to feed the pulverized coal to the combustion chamber.

Also introduced to the combustion chamber at 96 is an intimate mixture of oxygen and air. The oxygen is separated from the air by separator 97, all of the air used by the system entering at 98.

Included in the exhaust duct is a plurality of heat exchangers for extracting heat from the gases leaving the MHD generator. The heat aids in converting water to steam which is used for driving the following turbines: high pressure turbine 99, reheat turbine 100, and low pressure turbine 101. The reheat turbine is secured to shaft 102 which drives, not only the exhaust compressor 93, but a number of other compressors constituting a portion of the oxygen separation and compression system that will be explained.

The low and high pressure turbines drive an alternating current generator 103, which delivers its net power output to conductor 104. The MHD generator delivers power to inverter 105 which, in turn, delivers its net power output to conductor 106. Allowing 10,000 kw. for driving auxiliaries, the combined net power output from both sources is 436,000 kw. The inverter 105 is provided to convert the direct current output of the MHD generator to alternating current. Use of an inverter is not necessary if the MHD generator is arranged to produce alternating current directly or if direct current output is desired. In the latter event, a direct current generator would be used at 103.

Oxygen separation system

Air aspirated from the atmosphere at 98 is piped to main air compressor 107 by which it is compressed to 83 p.s.i. and 533° F. and delivered to after-cooler 108. From the after-cooler, the air at 80° F. and 83 p.s.i. flows via conduit 109 to the separator 97. Of the 2,500,000 pounds/hour of air compressed by the main air compressor, 100,000 pounds/hour are bled by conduit 110 to the first stage 111 of a high pressure compressor, a second stage being provided at 111a. Between the stages of the high pressure compressor, the air is cooled by inter-cooler 112, and it is further cooled after leaving the second stage of the high pressure compressor by after-cooler 113. From the after-cooler, the air at 80° F. and 1760 p.s.i. flows through conduit 114 to the separator where it is expanded to lower pressure to provide refrigeration for the separation process. Using expansion and fractionation techniques, the separator 97 separates the oxygen of the air from the nitrogen. (Minor constituents of the air have no practical effect on system operation and may be ignored.) The nitrogen is delivered as a by-product at 115 and substantially pure oxygen is delivered to conduit 116.

With the aid of a suitable mixing valve, the oxygen is mixed with a suitable amount of air from inlet 98 to form a mixture of 87% oxygen and 13% nitrogen by volume which is supplied via conduit 117 to compressor 118. From this compressor, the mixture flows through an inter-cooler 119 before entering a second compressor 120 which further compresses the mixture and delivers it to conduit 121. This conduit directs the mixture at 469° F. and 479 p.s.i. to a preheater 122, positioned in the exhaust duct, where it is heated to about 1000° F. before being fed to the combustion chamber through conduit 96.

As has been pointed out, the specific type of separator does not constitute a limitation of the invention. The arrangement of conduits and operating pressures, distribution of high and low pressure gas flow, etc., shown with respect to separator 97 is, however, commensurate with separation by the Linde-Frankl process. Since the process itself constitutes no part of the present invention, it will not be described in further detail. An excellent discussion of the process will be found in "The Separation of Gases" by M. Ruhemann, second edition, Oxford, At the Clarendon Press (1949), page 174 et seq.

It should be noted that separation processes different from the conventional liquefication-distillation type, such as those involving separation of oxygen through preferential solubility and membrane separation, could conceivably be used to supply the system. It should also be emphasized that oxygen-rich combustion supporting medium may be provided by a separator whose direct output is a mixture of oxygen and nitrogen having a higher percentage of oxygen than air.

Steam plant

Water is introduced to the steam plant at the rate of 1,410,000 pounds/hour at 60° F. and 2200 p.s.i. through feed water pump 123. From the pump the water flows to a plurality of inter-coolers and heat exchangers as will now be described. For simplicity, the feed water pump is shown discharging to conduits $a, c, e, g$ and $i$. Shown opposite these conduits, at the upper right hand portion of the drawing, are conduits $b, d, f, h$ and $j$. The water, in passing from one set of conduits to the other, picks up heat in the various inter-coolers and heat exchangers, flow of water through such equipment being indicated by coils and associated letter designations. For instance, note after-cooler 108, to which water is supplied at $a$ and from it exits at $b$. The following is a tabulation of such heat exchangers and their associated water connections.

| Heat exchangers: | Connections |
|---|---|
| After-cooler 108 | $a$–$b$ |
| Inter-cooler 119 | $c$–$d$ |
| Inter-cooler 112 | $e$–$f$ |
| After-cooler 113 | $g$–$h$ |

Water from the feed pump is directly delivered to stack cooler 124 from which it exits at $j_1$ and flows to conduit $j$. Water is also supplied to pre-economizer 125 at $i$.

In passing through the various heat exchangers and the stack cooler, the water is heated and recombined at 126 with water from the pre-economizer at an average temperature of 473° F. The combined water then flows through economizer 127 where its temperature is raised to 600° F. The water then flows via conduit 128 to cooling jackets 129 and 130 of the combustion chamber and MHD generator, respectively. Sufficient heat is picked up in the cooling jackets to convert the water to steam at 636° F. and 2200 p.s.i. The steam flows through conduit 131 to super heater 132. To the super-heater is also supplied additional steam at like temperature and pressure from evaporator 133, the evaporator being supplied with water at 600° F. from the outlet of the economizer via conduit 134.

The steam, superheated to 1050° F. and 2000 p.s.i., flows through conduit 135 to the high pressure turbine 99. After leaving this turbine, the steam passes through reheater 136 where additional heat is picked up from the exhaust plasma and the steam is restored to a temperature of 1050° F. at 400 p.s.i. This steam flows via conduit 137 to the reheat turbine 100 from which it exhausts at 8 p.s.i. and flows via conduit 138 to the low pressure turbine 101. From this latter turbine the steam exhausts to condenser 139 which operates at 1.5 inches of mercury absolute. The vacuum in the condenser is maintained by a pump 140 which discharges the condensate from the condenser to a heat sink. A portion of the condensate may be supplied to a cooling coil 141 in advance of the exhaust compressor. From the coil, the condensate is discharged to any suitable sink.

Heat recovered by the water which circulates through the various inter-coolers and after-coolers improves the overall efficiency of the system and reduces the cost to the system of operating the separator.

Operational considerations

The power plant described with reference to FIGURE 10, operating on a mixture of 87% oxygen and 13% nitrogen by volume, would consume 680,000 pounds/hour of the mixture in burning 217,000 pounds/hour of coal. To promote ionization as has been explained, an additive, such as potassium chloride, would be intimately mixed with the coal and be introduced to the combustion chamber at the rate of 3000 pounds/hour.

Commensurate with the other parameters of the system, the plasma resulting from the combustion process would have a temperature of 6,350° F. at a pressure of 472 p.s.i. The plasma, when expanded through the generator to a pressure of 4.5 p.s.i., would have a temperature of 4,100° F. Because of low electrical conductivity, it is not economically feasible to operate an MHD generator at temperatures significantly below the suggested exit temperature of 4,100° F.

From 4.5 p.s.i. at the exit of the MHD generator, the gases drop in pressure to 3 p.s.i. at the inlet of the exhaust compressor 93. In the course of its travel these gases gradually drop in temperature until they are cooled to 1600° F. after the evaporator 133; 1000° F. after the economizer 127; 400° F. after pre-economizer 125; and 150° F. after coil 141. After compression in exhaust compressor 93, the gases have a temperature of 465° F. The stack cooler 124 cools the gases to 160° F. at which temperature they exhaust from the system.

Operating with a magnetic field which varies between 70,000 gauss at the generator inlet to 15,000 gauss at its exit, the generator produces 345,000 kw. of power at 1460 volts. Maintenance of the magnetic field requires 18,000 kw., leaving a remainder of 327,000 kw. supplied to the inverter. Allowing for an inverter loss of 13,000 kw., the net output of the MHD generator, after field excitation and inversion, is 314,000 kw.

For the cycle illustrated, the separator consumes between 11 and 14% of the total power generated by both the MHD generator and the steam plant, or about 22 to 28% of the power generated by the MHD generator alone. The total power consumption in those portions of the system directly chargeable to the MHD generator represents 24 to 27% of the total power output of the steam driven and MHD generators.

The reheat turbine delivers 144,100 kw. through shaft 102 to the associated compressors. The individual compressors consume power as follows:

| | Power required, kw. |
|---|---|
| Exhaust compressor 93 | 21,300 |
| Main air compressor 107 | 80,200 |
| Compressor 118 | 22,400 |
| Compressor 120 | 14,600 |
| High pressure compressor: | |
|   First stage 111 | 3,200 |
|   Second stage 111a | 2,400 |

The system described is designed to produce the oxygen required under all conditions of operation. This is accomplished by designing the reheat turbine so that its power output is equal to the power consumption of the compressors that it drives. Fortunately, the turbine speed closely matches that of the compressors, eliminating the need for expensive and troublesome gear boxes. Direct drive also assures optimum turbine efficiency and represents a minimum investment in the capital equipment of the system.

The operating data presented with respect to FIGURE 10 is extremely conservative and well within the state of the art. Even with such conservative figures, an overall operating efficiency of 47.5% may be realized. With improved separator performance, higher gas conductivity in the MHD generator, and higher generator operating temperatures, considerably higher operating efficiencies are attainable.

For purposes of illustration, the FIGURE 10 system has been described with reference to use of mixture of 87% oxygen and 13% nitrogen as the combustion supporting medium. As mentioned earlier, however, systems of the type described may be used with different oxygen concentrations, depending upon such factors as generator size, the amount of additive introduced to the combustion products, and in particular, the temperature to which the mixture is preheated before combustion. Using only mild degrees of preheat, such as can readily be obtained by use of present day shell and tube type heat exchangers, oxygen concentration between 50% and 100% by volume ($1.0 > N_2/O_2 > 0$) is recommended. As preheat temperatures are increased, the oxygen concentration can be reduced. Obviously, a combination of both preheat and oxygen enrichment is most desirable from the standpoint of producing plasma of extremely high temperature.

For purposes of illustration, the FIGURE 10 power plant has been described with reference to use of coal as a fuel. Obviously, other fuels, such as natural gas and oil, could be used. Should coal be used, formation of slag must be considered. Since slag may impede heat transfer across heat exchange surfaces, a slag trap 142 is schematically indicated at the outlet of the MHD generator.

Representative operating parameters have been described with reference to the preferred embodiment of the invention illustrated in FIGURE 10. It should be emphasized, however, that such values do not constitute limitations of the invention and are offered for illustrative purposes only. Obviously, the parameters of any system, embodying the invention, may be chosen commensurate with its operational and design requirements and the particular arrangement of components that may be employed.

Economic considerations

A power plant of the type described can be produced with a capital investment equal to or less than that of conventional power plants of comparable power output. The fact that the operating efficiency of the system significantly exceeds that of conventional systems in itself indicates that the capital invested in the system is used more effectively than in conventional power plants.

In addition to the power generated by the system, nitrogen is produced as a valuable by-product. In the FIGURE 10 system, almost 2,000,000 pounds per hour of nitrogen of 98–99% purity is produced. Attributing even a modest value per pound to the nitrogen, it will immediately be apparent that the value of the nitrogen is substantial.

MHD power generating systems, including oxygen producing equipment, can be designed to handle peak power demands with maximum efficiency. Thus, by way of illustration, the system can be designed so that its generator is capable of producing power equal to the peak demand. If the oxygen separator is designed for an output approximately equal to the average demand for a 24-hour period, excess oxygen, produced during periods of low demand, can be stored for use during periods of peak demand. In this way, the oxygen separator can be operated at rated conditions at all times. Further, in this way, the oxygen separator may be made smaller and of lower cost than required for producing oxygen at the rate consumed during peak operation.

Conclusion

It will be understood from the foregoing description that the principles of the present invention may be employed to advantage in many different types of power plants. It will also be appreciated that the system as disclosed, although not limited to such use, lends itself particularly well to use in large size stationary power plants and makes possible operation at efficiencies far beyond those of existing equipment. The improved power plant can be built within the state of the art using known MHD techniques.

The various features and advantages of the embodiments disclosed are thought to be clear from the foregoing description. Various other features and advantages, not specifically enumerated, will undoubtedly occur to those versed in the art, as likewise will many advantages and modifications of the preferred embodiment of the invention illustrated, all of which may be achieved without departing from the spirit and scope of our invention.

We claim:

1. In combination in a stationary power plant, a combustion chamber, means for supplying pulverized coal to said combustion chamber, a separator for separating oxygen from air, an air compressor for aspirating ambient air and supplying the air under pressure to said separator, high pressure compressors for further compressing a portion of the air from said first-named compressor and delivering it to said separator, said separator utilizing the compressed air of higher and lower pressure for separation purposes and producing separate quantities of substantially pure oxygen and nitrogen, means for compressing said oxygen and mixing it with a predetermined quantity of air to produce a high pressure mixture, a preheater, means for passing the oxygen-air mixture in heat exchange relationship through said preheater and delivering it to said combustion chamber for supporting combustion of the coal to produce electrically conductive gases at high temperature and pressure, a magnetohydrodynamic generator connected to said combustion chamber for receiving the gases produced thereby, the gases expanding through said generator to generate electric power by movement relative thereto, the gases after leaving said generator passing in heat exchange relationship through said preheater for preheating and oxygen-air mixture, a steam power plant including means for extracting heat from the gases exhausted from said MHD generator and from said combustion chamber and said generator for producing high pressure steam, and a turbine through which the steam is expanded, said turbine driving said beforementioned compressors.

2. Apparatus as defined in claim 1 and, in addition, an exhaust compressor driven by said turbine for maintaining below-atmospheric pressure at the exit of said magnetohydrodynamic generator.

3. In combination in a power plant utilizing electrically conductive gas for generating electric power, a combustion chamber; a source of fuel for said combustion chamber; a separator for separating oxygen from the air; means for mixing air with the oxygen to form a predetermined mixture; means for compressing the mixture and supplying it to said combustion chamber for burning the fuel and producing high temperature, high pressure, electrically conductive gas; a magnetohydrodynamic generator connected to said combustion chamber for receiving gas therefrom; expansion of the high pressure gas causing it to flow at high velocity through said generator whereby electric power is produced by said generator; a preheater; means for passing the oxygen-air mixture in heat exchange relationship through said preheater before introduction to said combustion chamber; and means for directing gas from said generator in heat exchange relationship through said preheater whereby heat from the gas preheats the oxygen-air mixture before it enters said combustion chamber.

4. Apparatus as defined in claim 3 and, in addition, a steam power plant including heat exchange means for extracting heat from the gas after it leaves said magnetohydrodynamic generator for producing steam at high temperature and pressure, a plurality of turbines driven by the steam from said exchange means, at least one of said turbines driving said compressor for compressing the oxygen-air mixture, and an electric generator, the remainder of said turbines driving said electrical generator whereby electric power is produced for supplementing the power output of said magnetohydrodynamic generator.

5. Apparatus as defined in claim 4 and, in addition, an exhaust compressor driven by one of said plurality of turbines for maintaining below-atmospheric pressure at the exit of said magnetohydrodynamic generator.

6. In combination in a power plant, a combustion chamber; means for supplying fuel to said combustion chamber; means for separating oxygen from the ambient air and delivering the oxygen at high pressure to said combustion chamber for burning the fuel and producing high temperature, high pressure, electrically conductive gas; a magnetohydrodynamic generator connected to said combustion chamber, the gas from said combustion chamber expanding through said generator to generate electric power; and a preheater, oxygen from said separating means passing through said preheater before introduction to said combustion chamber, the gas after expansion through said generator passing through said preheater for imparting heat to the oxygen as it passes through said preheater.

7. Apparatus as defined in claim 6 and, in addition, a steam plant including steam driven electric power generating means for extracting heat from the gas after it leaves said magnetohydrodynamic generator, the power generated by said last-named generating means supplementing the power generated by said magnetohydrodynamic generator.

8. In combination in a power plant, a combustion chamber, a source of fuel for said combustion chamber, means for producing oxygen-rich combustion supporting medium for burning the fuel in said combustion chamber to produce electrically conductive gas at high temperature and pressure, a magnetohydrodynamic generator, the gas from said combustion chamber being directed to and expanding through said generator whereby electric power is generated, a preheater, the gas after leaving said generator passing through said preheater, said combustion supporting medium passing through said preheater before delivery to said combustion chamber whereby heat from the gas is imparted to the combustion supporting medium as it passes through said preheater.

9. Apparatus as defined in claim 8, and in addition, a steam plant to which is delivered the gas after its passage through said preheater, said steam plant extracting heat from the gas to generate electricity for supplementing the electric power output of said generator.

10. Apparatus as defined in claim 9 in which the fuel includes an additive for increasing electrical conductivity of the gas produced in said combustion chamber.

11. In combination in a power plant, a combustion chamber, a source of fuel for said combustion chamber, means for producing an oxygen-rich combustion supporting medium as compared to ambient air for burning the fuel in said combustion chamber to produce gases at high temperature, a heat exchanger, the gases from said combustion chamber flowing in heat exchange relationship through said heat exchanger, a closed magnetohydrodynamic electrical generating system employing nonmetallic electrically conductive plasma, said system including a magnetohydrodynamic generator and means for circulating said plasma in closed cycle through said heat exchanger and magnetohydrodynamic generator whereby the plasma is heated in said heat exchanger to a temperature at which it is electrically conductive and forced through said generator to generate electric power.

12. Apparatus as defined in claim 11 in which said closed system includes a preheater for receiving spent plasma after its passage through said MHD generator for transferring heat from the spent plasma to the combustion supporting medium before its introduction to said combustion chamber.

13. Apparatus as defined by claim 12 in which said means for producing the combustion supporting medium is operated by power produced by the power plant.

14. In combination in a power plant, a combustion chamber, means for supplying fuel to said combustion chamber, means for separating oxygen from the air and delivering it to said combustion chamber to provide an oxygen-rich medium as compared to ambient air for supporting combustion of the fuel whereby electrically conductive plasma at high temperature and pressure is produced in said combustion chamber, a magnetohydrodynamic generator, and means for maintaining at the exit of said generator a pressure lower than that prevailing in said combustion chamber, plasma from said combustion chamber expanding through said generator under the influence of the pressure differential existing across said generator.

15. In combination a power plant having a combustion chamber for producing plasma for a magnetohydrodynamic generator, a source of fuel for the combustion chamber, and means for separating oxygen from the air and supplying an intermediate mixture of oxygen-rich air as compared to ambient air to the combustion chamber for supporting combustion of fuel and producing electrically conductive, nonmetallic plasma at high temperature and pressure for use in the magnetohydrodynamic generator, said separating means being operated by power from the power plant.

16. In combination in a power plant employing plasma to generate electricity, a magnetohydrodynamic generator including spaced electrodes and means for generating a magnetic field in a region of space between said electrodes with the field extending transversely to the separation of said electrodes, a combustion chamber for supplying plasma to said magnetohydrodynamic generator, and a source of fuel for said combustion chamber, the fuel being supplied to and burned in said combustion chamber to produce plasma having a temperature above approximately 5000° F., the plasma from said combustion chamber flowing through said region transversely to the field and to the separation between said electrodes and expanding in said region to a temperature not less than approximately 4100° F.

17. In combination in a power plant employing plasma to generate electricity, a magnetohydrodynamic generator including spaced electrodes and means for generating a magnetic field in a region of space between said electrodes with the field extending transversely to the separation of said electrodes, a combustion chamber for supplying plasma to said magnetohydrodynamic generator, a source of fuel for said combustion chamber, and means for supplying an oxygen-enriched atmosphere as compared to ambient air to said combustion chamber, the fuel being burned in the oxygen-enriched atmosphere within said combustion chamber to produce plasma having a temperature above approximately 5000° F., the plasma from said combustion chamber flowing through said region transversely to the field and to the separation between said electrodes, the plasma in flowing through said generator expanding in said region to a temperature not less than approximately 4100° F.

18. In combination in a power plant, a magnetohydrodynamic generator including spaced electrodes and means for generating a magnetic field in a region of space between said electrodes with the field extending transversely to the separation of said electrodes, a source of fuel, a source of combustion supporting medium, means for burning the fuel in the combustion supporting medium to produce combustion products having a temperature above approximately 5000° F., the combustion products flowing through said region in a direction transverse to the field and to the separation between said electrodes and expanding in said region to a temperature not below approximately 4100° F., and means for effecting transfer of heat from the expanded combustion products leaving said generator to the combustion supporting medium in advance of its introduction to said means for burning the fuel.

19. The method of generating electric power which comprises the steps of burning fuel to develop products of combustion having a temperature above approximately 5000° F., generating a magnetic field in a region of space between two electrodes with said field extending transversely to the separation of said electrodes, and allowing said products of combustion to flow through said region transversely to said field and to said separation, thereby reducing the temperature of said products of combustion to not less than approximately 4100° F.

20. The method of generating electric power which comprises generating in a region of space between two electrodes a magnetic field transverse to the separation of those electrodes, burning fuel in an oxygen-enriched atmosphere as compared to ambient air to develop products of combustion at temperatures of above approximately 5000° F., and allowing said products of combustion to expand through said region in a direction transverse to the direction of said field and transverse to the separation of said electrodes, thereby reducing the temperature of said products of combustion to not less than approximately 4100° F.

21. The method of converting thermal energy to electric energy which comprises the steps of developing in a region of space between two electrodes a magnetic field transverse to the separation of those electrodes, burning a fuel in combination with a pre-heated combustion supporting medium to develop products of combustion having a temperature of at least approximately 5000° F., allowing the products of combustion of said fuel to expand through said region in a direction transverse to said field and to said separation to reduce the temperature of said products of combustion to a temperature not below 4100° F., and effecting transfer of heat from said expanded products of combustion to fresh combustion supporting medium for the burning of additional fuel.

22. A power plant for converting heat to electrical energy comprising a magnetohydrodynamic generator and at least one steam heat converter arranged in series therewith disposed in and utilizing the efflux thereof, said plant comprising a combustion chamber for producing plasma and supplying it to the magnetohydrodynamic generator at a temperature in excess of approximately 4000 degrees F., means for moving said plasma at high velocity through said magnetohydrodynamic generator whereby to generate electric power at high efficiency, a first distribution means for such power, a duct for exhausting said efflux, heat exchangers in said duct, steam generating means connected to said heat exchangers, a steam heat converter for generating electric power connected to said steam generating means, a second distribution means for such power, said first and second distribution means being connected together for combining the electric power output of said magnetohydrodynamic generator and said steam heat converter.

23. In combination in a power plant, a combustion chamber, a source of fuel for said combustion chamber, means for supplying an oxygen-rich medium as compared to ambient air to said combustion chamber for supporting combustion of the fuel and producing an electrically conductive plasma at high temperature and pressure, said fuel including an additive for increasing the electrical conductivity of the plasma formed in said combustion chamber, a magnetohydrodynamic generator arranged to receive plasma produced in said combustion chamber, plasma from said combustion chamber expanding through said generator to generate electric power, and means for supplying power derived from the power plant to said means for supplying said medium to said combustion chamber.

24. In combination in a power plant having a combustion chamber for supplying plasma to a magnetohydrodynamic generator, a source of fuel for the combustion chamber, said fuel including an additive for promoting ionization of the plasma produced in said combustion chamber, and means for supplying oxygen-rich combustion supporting medium as compared to ambient air to the combustion chamber for burning the fuel and producing electrically conductive, substantially non-metallic plasma at high temperature and pressure for use in the magnetohydrodynamic generator.

25. In combination in a device utilizing electrically conductive plasma for generating electric power, means for producing plasma comprising a source of fuel, a source of combustion supporting medium having an oxygen concentration greater than that of ambient air, and means for burning the fuel in the presence of the combustion supporting medium to produce electrically conductive plasma at high pressure, said fuel including an additive for promoting electrical conductivity of the plasma produced by combustion of the fuel with said combustion supporting medium; and a magnetohydrodynamic generator through which the plasma expands to a lower pressure for generating electric power.

References Cited by the Examiner

UNITED STATES PATENTS

| | | | |
|---|---|---|---|
| 1,443,091 | 1/1923 | Petersen | 310—11 X |
| 1,509,103 | 9/1924 | Elliott. | |
| 1,717,413 | 6/1929 | Rudenberg. | |
| 2,095,747 | 10/1937 | Jacobsson. | |
| 2,210,918 | 8/1940 | Karlovitz | 310—11 |

FOREIGN PATENTS

| | | |
|---|---|---|
| 841,613 | 6/1952 | Germany. |
| 734,201 | 7/1955 | Great Britain. |
| 738,511 | 10/1955 | Great Britain. |

OTHER REFERENCES

Pub.: Electronics, November 1959, pp. 82, 84–85.
Pub.: Power, 1959, pp. 62–65.

MILTON O. HIRSHFIELD, *Primary Examiner.*

ORIS L. RADER, *Examiner.*

R. C. SIMS, D. X. SLINEY, *Assistant Examiners.*